Patented Aug. 7, 1934

1,968,984

UNITED STATES PATENT OFFICE 1,968,984

METHOD AND FLUX FOR AUTOGENOUSLY WELDING MAGNESIUM AND ITS ALLOYS

William O. Binder, Midland, Mich., assignor to The Dow Chemical Company, Midland, Mich., a corporation of Michigan No Drawing. Application December 23, 1931, Serial No. 582,869

3 Claims. (Cl. 148—26)

The present invention relates broadly to welding fluxes and a method of using same, and more specifically to fluxes generally applicable for the autogenous welding of articles made from magnesium or alloys thereof.

I am aware that many attempts have been made to develop welding fluxes suitable for use with magnesium and its alloys and although a very few fluxes have been produced which can be so used, still none of such fluxes can be considered as wholly satisfactory. The melting point of magnesium and its alloys is so low that difficulty is had in obtaining welding flux mixtures which will have a melting point lower than the melting point of the metal, are non-hygroscopic, do not react with the metal, and do not contain heavy metal compounds. To obtain such a low melting point flux, the practice heretofore has been to use either lithium chloride or lithium bromide in substantial amount as an essential ingredient in the flux. While these materials do reduce the melting point of the flux to a marked extent, still I have found that they are undesirable since they are hygroscopic, both when alone and generally when mixed with the other ingredients of the flux. The hygroscopic nature of such fluxes is detrimental, since it makes special precautions necessary during storage of the flux before use and also subjects an article welded with such flux to atmospheric corrosion due to the flux on and/or in the weld attracting moisture which, in the presence of salts, causes active corrosion of the metal. I am also aware that it has been proposed (British Patent No. 264,238) to use fused mixtures of alkali and alkaline earth metal halides in simple multiples of molecular proportions as welding fluxes for magnesium wherein hygroscopic nature of the materials involved is claimed to be overcome. This procedure, I have found by experiment, does not hold for all simple molecular proportion mixtures of the above halides and, moreover, it does not hold in connection with ingredients given in the preferred formula. Moreover, I have found that it is not necessary to use the ingredients of my improved welding flux in simple molecular ratios. Furthermore, I have now found that the use of lithium chloride or lithium bromide is not essential for the production of a satisfactory welding flux for the autogenous welding of magnesium and its alloys.

Accordingly, among the objects of the present invention is the provision of a procedure and composition suitable for use in the autogenous welding of articles made from magnesium and its alloys. Other objects and advantages will appear as the description proceeds.

To the accomplishment of the foregoing and related ends, the invention, then, consists of the methods, steps, and compositions hereinafter fully described and particularly pointed out in the claims, the following description setting forth in detail several forms of composition and modes of carrying out the invention, such disclosed forms and modes illustrating, however, but several of the various ways in which the principle of the invention may be used.

I have now found that a highly satisfactory welding flux, which is free from hygroscopic properties either before or after use, can be formed by using with sodium chloride, potassium chloride, and barium chloride, at least one non-hygroscopic fluoride taken from the group consisting of lithium fluoride, calcium fluoride, magnesium fluoride, sodium fluoride. The fluorides as listed have been enumerated in the order of their desirability. These fluxes, I have found, have satisfactory melting points, are non-hygroscopic, and provide good protection and cleaning power during the welding operation.

Such fluxes consist of fused mixtures of the above noted materials in the following proportions:—barium chloride 10 to 60 per cent, a non-hygroscopic fluoride 2 to 10 per cent, and 30 to 90 per cent of a mixture containing 30 to 60 per cent of sodium chloride, and 70 to 40 per cent of potassium chloride. In the above example, the ranges given are of a breadth that closely approach the outside limits of the compositions suitable for this use. A narrower range within which I normally prefer to work is as follows:— barium chloride 20 to 50 per cent, a non-hygroscopic fluoride 4 to 6 per cent, and 45 to 75 per cent of a mixture containing 40 to 50 per cent of sodium chloride and 60 to 50 per cent potassium chloride. A specific composition suitable for practically all purposes in connection with the autogenous welding of magnesium and magnesium alloys is as follows:—

| | Per cent |
|---|---|
| Barium chloride | 40 |
| Potassium chloride | 30 |
| Sodium chloride | 25 |
| Lithium fluoride | 5 |

In forming my improved welding flux, all of the ingredients can be mixed together, fused and stirred up to assure their thorough intermixture. However, for most purposes, I prefer first to fuse all of the ingredients except the fluoride which I add last under stirring to insure a uniform mixture. After the materials have been thoroughly mixed in the fused state, I prefer to solidify the batch and pulverize or otherwise finely divide same so as to put it in a form convenient for sprinkling over the area to be welded or for use in fused condition for coating the welding rod at the time of autogenously welding a magnesium article, the rod acting as a source of metal for the weld. The flux is also adaptable for use in the form of sticks as well as in the form of a strong aqueous solution which can be brushed over or around the area to be welded, or it may be applied directly to the welding rod. It is to be noted, however, that it is unnecessary to solidify and comminute the flux since, obviously, the so prepared fused flux could be transferred directly to a fusion pot which maintains the flux in fused state ready for use as required.

Other modes of applying the principle of my invention may be employed instead of those explained, change being made as regards the process and composition herein disclosed, provided the means stated by any of the following claims or the equivalent of such stated means be employed.

I therefore particularly point out and distinctly claim as my invention:—

1. A process of autogenously welding magnesium and its alloys which consists in heating the parts to be welded to a welding temperature, and applying thereto a flux consisting of barium chloride approximately 40 per cent, potassium chloride approximately 30 per cent, sodium chloride approximately 25 per cent, and lithium fluoride approximately 5 per cent.

2. A welding composition suitable for use in welding magnesium and its alloys which consists of barium chloride 20 to 50 per cent, lithium fluoride 4 to 6 per cent, and 75 to 45 per cent of a mixture containing 40 to 50 per cent sodium chloride and 60 to 50 per cent of potassium chloride.

3. A welding flux suitable for welding magnesium and its alloys which consists of barium chloride approximately 40 per cent, potassium chloride approximately 30 per cent, sodium chloride approximately 25 per cent, and lithium fluoride approximately 5 per cent.

WILLIAM O. BINDER.